United States Patent
Chuey

(10) Patent No.: US 7,183,940 B2
(45) Date of Patent: Feb. 27, 2007

(54) RADIO RELAY APPLIANCE ACTIVATION

(75) Inventor: Mark D. Chuey, Northville, MI (US)

(73) Assignee: Lear Corporation, Southfield, MI (US)

( * ) Notice: Subject to any disclaimer, the term of this patent is extended or adjusted under 35 U.S.C. 154(b) by 597 days.

(21) Appl. No.: 10/630,103

(22) Filed: Jul. 30, 2003

(65) Prior Publication Data

US 2005/0024254 A1    Feb. 3, 2005

(51) Int. Cl.
*G08C 19/00* (2006.01)

(52) U.S. Cl. ............... 340/825.69; 340/825.72; 341/176

(58) Field of Classification Search ........... 340/825.72, 340/825.69; 341/176
See application file for complete search history.

(56) References Cited

U.S. PATENT DOCUMENTS

| | | |
|---|---|---|
| 1,522,241 A | 1/1925 | Hennessey |
| 3,098,212 A | 7/1963 | Creamer, Jr. |
| 3,300,867 A | 1/1967 | Sampson |
| 3,337,992 A | 8/1967 | Tolson |
| 3,456,387 A | 7/1969 | Tolson |
| 3,680,951 A | 8/1972 | Jordan et al. |
| 4,074,200 A | 2/1978 | Buchta |
| 4,167,833 A | 9/1979 | Farina et al. |
| 4,178,549 A | 12/1979 | Ledenbach et al. |
| 4,219,812 A | 8/1980 | Rittenbach |
| 4,241,870 A | 12/1980 | Marcus |
| 4,247,850 A | 1/1981 | Marcus |
| 4,425,717 A | 1/1984 | Marcus |
| 4,447,808 A | 5/1984 | Marcus |
| 4,453,161 A | 6/1984 | Lemelson |
| 4,482,947 A | 11/1984 | Zato et al. |
| 4,529,980 A | 7/1985 | Liotine et al. |
| 4,535,333 A | 8/1985 | Twardowski |
| 4,581,827 A | 4/1986 | Higashi |
| 4,595,228 A | 6/1986 | Chu |
| 4,598,287 A | 7/1986 | Osakabe et al. |
| 4,623,887 A | 11/1986 | Welles, II |
| 4,631,708 A | 12/1986 | Wood et al. |
| 4,635,033 A | 1/1987 | Inukai et al. |

(Continued)

FOREIGN PATENT DOCUMENTS

EP    0 670 402 A1    9/1995

(Continued)

OTHER PUBLICATIONS

Garage Door/Gate Remote Control User's Instructions (Model 39), Skylink Technologies Inc., 2002.

(Continued)

*Primary Examiner*—Wendy R. Garber
*Assistant Examiner*—M Shimizu
(74) *Attorney, Agent, or Firm*—Brooks Kushman P.C.

(57) ABSTRACT

Remote appliance activation can be achieved by relaying between radio frequency transmission schemes having different characteristics. A radio receiver receives radio frequency control signals for controlling the appliance. Each existing radio frequency transmitter is specifically designed to transmit wireless radio frequency control signals having receiver characteristics to the radio receiver. A new wireless radio frequency transmitter has transmitter characteristics, at least one of which is different from receiver characteristics. A radio relay learns the receiver characteristics from one of the existing transmitters and learns at least one transmitter characteristic from the new transmitter. Then, when an appliance radio frequency activation command is received from the new transmitter, the radio relay transmits a new radio frequency appliance activation command having the learned receiver characteristics.

42 Claims, 7 Drawing Sheets

U.S. PATENT DOCUMENTS

| | | | |
|---|---|---|---|
| 4,638,433 A | 1/1987 | Schindler |
| 4,665,397 A | 5/1987 | Pinnow |
| 4,676,601 A | 6/1987 | Itoh et al. |
| 4,700,327 A | 10/1987 | Hilton |
| 4,703,359 A | 10/1987 | Rumbolt et al. |
| 4,706,299 A | 11/1987 | Jorgensen |
| 4,707,788 A | 11/1987 | Tashiro et al. |
| RE32,576 E | 1/1988 | Pastore |
| 4,727,302 A | 2/1988 | Mizuta et al. |
| 4,743,905 A | 5/1988 | Wiegand |
| 4,747,159 A | 5/1988 | Kato |
| 4,750,118 A | 6/1988 | Heitschel et al. |
| 4,754,255 A | 6/1988 | Sanders et al. |
| 4,771,283 A | 9/1988 | Imoto |
| 4,793,690 A | 12/1988 | Gahan et al. |
| 4,799,189 A | 1/1989 | Grover |
| 4,806,930 A | 2/1989 | Wojciak, Jr. |
| 4,825,200 A | 4/1989 | Evans et al. |
| 4,881,148 A | 11/1989 | Lambropoulos et al. |
| 4,882,565 A | 11/1989 | Gallmeyer |
| 4,886,960 A | 12/1989 | Molyneux et al. |
| 4,890,108 A | 12/1989 | Drori et al. |
| 4,896,030 A | 1/1990 | Miyaji |
| 4,905,279 A | 2/1990 | Nishio |
| 4,912,463 A | 3/1990 | Li |
| 4,917,477 A | 4/1990 | Bechtel et al. |
| 4,953,305 A | 9/1990 | Van Lente et al. |
| 4,978,944 A | 12/1990 | Andros et al. |
| 4,988,992 A | 1/1991 | Heitschel et al. |
| 5,016,996 A | 5/1991 | Ueno |
| 5,064,274 A | 11/1991 | Alten |
| 5,085,062 A | 2/1992 | Capdevila |
| 5,103,221 A | 4/1992 | Memmola |
| 5,109,222 A | 4/1992 | Welty |
| 5,113,821 A | 5/1992 | Fukui et al. |
| 5,122,647 A | 6/1992 | Lynam et al. |
| 5,123,008 A | 6/1992 | Beesley |
| 5,126,686 A | 6/1992 | Tam |
| 5,146,215 A | 9/1992 | Drori |
| 5,154,617 A | 10/1992 | Suman et al. |
| 5,181,423 A | 1/1993 | Philipps et al. |
| 5,191,610 A | 3/1993 | Hill et al. |
| 5,193,210 A | 3/1993 | Nicholas et al. |
| 5,201,067 A | 4/1993 | Grube et al. |
| 5,225,847 A | 7/1993 | Roberts et al. |
| 5,243,322 A | 9/1993 | Thompson et al. |
| 5,252,960 A | 10/1993 | Duhame |
| 5,252,977 A | 10/1993 | Lueker et al. |
| 5,266,945 A | 11/1993 | Peek et al. |
| 5,278,547 A | 1/1994 | Suman et al. |
| 5,369,706 A | 11/1994 | Latka |
| 5,379,453 A | 1/1995 | Tigwell |
| 5,402,105 A | 3/1995 | Doyle et al. |
| 5,408,698 A | 4/1995 | Serizawa et al. |
| 5,412,379 A | 5/1995 | Waraksa et al. |
| 5,420,925 A | 5/1995 | Michaels |
| 5,442,340 A | 8/1995 | Dykema |
| 5,455,716 A | 10/1995 | Suman et al. |
| 5,463,374 A | 10/1995 | Mendez et al. |
| 5,471,668 A | 11/1995 | Soenen et al. |
| 5,473,317 A | 12/1995 | Inomata et al. |
| 5,475,366 A | 12/1995 | Van Lente et al. |
| 5,479,155 A | 12/1995 | Zeinstra et al. |
| 5,517,187 A | 5/1996 | Bruwer et al. |
| 5,528,230 A | 6/1996 | Kim |
| 5,554,977 A | 9/1996 | Jablonski et al. |
| RE35,364 E | 10/1996 | Heitschel et al. |
| 5,564,101 A | 10/1996 | Eisfeld et al. |
| 5,583,485 A | 12/1996 | Van Lente et al. |
| 5,594,429 A | 1/1997 | Nakahara |
| 5,596,316 A | 1/1997 | Honeck |
| 5,598,475 A | 1/1997 | Soenen et al. |
| 5,613,732 A | 3/1997 | Demick |
| 5,614,885 A | 3/1997 | Van Lente et al. |
| 5,614,891 A | 3/1997 | Zeinstra et al. |
| 5,619,190 A | 4/1997 | Duckworth et al. |
| 5,627,529 A | 5/1997 | Duckworth et al. |
| 5,645,308 A | 7/1997 | Fink |
| 5,646,701 A | 7/1997 | Duckworth et al. |
| 5,661,455 A | 8/1997 | Van Lente et al. |
| 5,661,651 A | 8/1997 | Geschke et al. |
| 5,661,804 A | 8/1997 | Dykema et al. |
| 5,680,131 A | 10/1997 | Utz |
| 5,680,134 A | 10/1997 | Tsui |
| 5,686,903 A | 11/1997 | Duckworth et al. |
| 5,686,904 A | 11/1997 | Bruwer |
| 5,691,848 A | 11/1997 | Van Lente et al. |
| 5,699,044 A | 12/1997 | Van Lente et al. |
| 5,699,054 A | 12/1997 | Duckworth |
| 5,699,055 A | 12/1997 | Dykema et al. |
| 5,708,415 A | 1/1998 | Van Lente et al. |
| 5,715,020 A | 2/1998 | Kuroiwa et al. |
| 5,726,645 A | 3/1998 | Kamon et al. |
| 5,731,756 A | 3/1998 | Roddy |
| 5,751,224 A | 5/1998 | Fitzgibbon |
| 5,793,300 A | 8/1998 | Suman et al. |
| 5,812,097 A | 9/1998 | Maldonado |
| 5,831,548 A | 11/1998 | Fitzgibbon |
| 5,838,255 A | 11/1998 | Di Croce |
| 5,841,253 A | 11/1998 | Fitzgibbon et al. |
| 5,841,390 A | 11/1998 | Tsui |
| 5,841,813 A | 11/1998 | Van Nee |
| 5,845,593 A | 12/1998 | Birkestrand |
| 5,854,593 A | 12/1998 | Dykema et al. |
| 5,872,513 A | 2/1999 | Fitzgibbon et al. |
| 5,903,226 A * | 5/1999 | Suman et al. .......... 340/825.69 |
| 5,910,784 A | 6/1999 | Lai |
| 5,926,087 A | 7/1999 | Busch et al. |
| 5,926,106 A | 7/1999 | Beran et al. |
| 5,940,000 A | 8/1999 | Dykema |
| 5,940,007 A * | 8/1999 | Brinkmeyer et al. ... 340/825.69 |
| 5,940,120 A | 8/1999 | Frankhouse et al. |
| 5,949,349 A | 9/1999 | Farris et al. |
| 6,002,332 A | 12/1999 | King |
| 6,005,508 A | 12/1999 | Tsui |
| 6,008,735 A | 12/1999 | Chiloyan et al. |
| 6,021,319 A | 2/2000 | Tigwell |
| 6,025,785 A | 2/2000 | Farris et al. |
| 6,031,465 A * | 2/2000 | Burgess .................... 340/5.54 |
| 6,043,753 A | 3/2000 | Okayasu et al. |
| 6,049,289 A | 4/2000 | Waggamon et al. |
| 6,055,508 A | 4/2000 | Naor et al. |
| RE36,703 E | 5/2000 | Heitschel et al. |
| 6,072,436 A | 6/2000 | Marougi |
| 6,078,271 A | 6/2000 | Roddy et al. |
| 6,081,203 A | 6/2000 | Fitzgibbon |
| 6,091,343 A | 7/2000 | Dykema et al. |
| 6,104,101 A | 8/2000 | Miller et al. |
| 6,127,740 A | 10/2000 | Roddy et al. |
| 6,130,625 A | 10/2000 | Harvey |
| 6,131,019 A | 10/2000 | King |
| 6,137,421 A | 10/2000 | Dykema |
| 6,154,544 A | 11/2000 | Farris et al. |
| 6,166,650 A | 12/2000 | Bruwer |
| 6,175,312 B1 | 1/2001 | Bruwer et al. |
| 6,181,255 B1 | 1/2001 | Crimmins et al. |
| 6,191,701 B1 | 2/2001 | Bruwer |
| 6,243,000 B1 | 6/2001 | Tsui |
| 6,249,673 B1 | 6/2001 | Tsui |
| 6,271,765 B1 | 8/2001 | King et al. |
| 6,282,152 B1 | 8/2001 | Kurple |
| 6,308,083 B2 | 10/2001 | King |
| 6,320,514 B1 | 11/2001 | Flick |
| 6,333,698 B1 | 12/2001 | Roddy |

| | | | |
|---|---|---|---|
| 6,344,817 B1 | 2/2002 | Verzulli | |
| 6,359,558 B1 | 3/2002 | Tsui | |
| 6,362,771 B1 | 3/2002 | Schofield et al. | |
| 6,377,173 B1 | 4/2002 | Desai | |
| 6,397,058 B1 | 5/2002 | Thibert et al. | |
| 6,414,587 B1 | 7/2002 | Fitzgibbon | |
| 6,441,719 B1 | 8/2002 | Tsui | |
| 6,486,795 B1 | 11/2002 | Sobel et al. | |
| RE37,986 E | 2/2003 | Heitschel et al. | |
| 6,525,645 B2 | 2/2003 | King et al. | |
| 6,542,076 B1 | 4/2003 | Joao | |
| 6,556,681 B2 | 4/2003 | King | |
| 6,556,813 B2 | 4/2003 | Tsui | |
| 6,559,775 B1 | 5/2003 | King | |
| 6,590,505 B1 * | 7/2003 | Matsui et al. | 340/825.72 |
| 6,597,291 B2 | 7/2003 | Tsui | |
| 6,634,408 B2 | 10/2003 | Mays | |
| 6,661,350 B1 | 12/2003 | Rohrberg et al. | |
| 6,690,796 B1 | 2/2004 | Farris et al. | |
| 6,703,941 B1 | 3/2004 | Blaker | |
| 6,759,350 B2 | 7/2004 | Tsai | |
| 6,774,813 B2 | 8/2004 | van Ee et al. | |
| 6,791,467 B1 | 9/2004 | BenZe'ev | |
| 6,810,123 B2 | 10/2004 | Farris et al. | |
| 6,822,603 B1 | 11/2004 | Crimmins et al. | |
| 6,903,650 B2 | 6/2005 | Murray | |
| 6,956,460 B2 | 10/2005 | Tsui | |
| 6,963,267 B2 | 11/2005 | Murray | |
| 6,975,203 B2 | 12/2005 | Brookbank et al. | |
| 2002/0034303 A1 | 3/2002 | Farris et al. | |
| 2002/0067826 A1 | 6/2002 | King | |
| 2002/0075133 A1 | 6/2002 | Flick | |
| 2002/0126037 A1 | 9/2002 | Fitzgibbon | |
| 2002/0137479 A1 | 9/2002 | Tsui | |
| 2002/0140569 A1 | 10/2002 | van Ee et al. | |
| 2002/0163440 A1 | 11/2002 | Tsui | |
| 2002/0190872 A1 | 12/2002 | Suman et al. | |
| 2002/0191794 A1 | 12/2002 | Farris et al. | |
| 2002/0197955 A1 | 12/2002 | Witkowski et al. | |
| 2003/0016119 A1 | 1/2003 | Teich | |
| 2003/0016139 A1 | 1/2003 | Teich | |
| 2003/0033540 A1 | 2/2003 | Fitzgibbon | |
| 2003/0067394 A1 | 4/2003 | Tsui | |
| 2003/0076235 A1 | 4/2003 | Tsui | |
| 2003/0085798 A1 | 5/2003 | Castro Esteban | |
| 2003/0118187 A1 | 6/2003 | Fitzgibbon | |
| 2003/0189530 A1 | 10/2003 | Tsui | |
| 2003/0197594 A1 | 10/2003 | Olson et al. | |
| 2003/0197595 A1 | 10/2003 | Olson et al. | |
| 2003/0216139 A1 | 11/2003 | Olson et al. | |
| 2003/0228879 A1 | 12/2003 | Witkowski et al. | |
| 2004/0048622 A1 | 3/2004 | Witkowski et al. | |
| 2004/0061591 A1 | 4/2004 | Teich | |
| 2004/0066936 A1 | 4/2004 | Farris et al. | |
| 2004/0110472 A1 | 6/2004 | Witkowski et al. | |
| 2004/0207537 A1 | 10/2004 | Keller, Jr. et al. | |
| 2004/0243813 A1 | 12/2004 | Farris et al. | |
| 2005/0024184 A1 | 2/2005 | Chuey | |
| 2005/0024185 A1 | 2/2005 | Chuey | |
| 2005/0024229 A1 | 2/2005 | Chuey | |
| 2005/0024230 A1 | 2/2005 | Chuey | |
| 2005/0024254 A1 | 2/2005 | Chuey | |
| 2005/0024255 A1 | 2/2005 | Chuey | |
| 2005/0026601 A1 | 2/2005 | Chuey | |
| 2005/0026602 A1 | 2/2005 | Chuey et al. | |
| 2005/0026605 A1 | 2/2005 | Guthrie et al. | |
| 2006/0181428 A1 | 8/2006 | Blaker et al. | |
| 2006/0217850 A1 | 9/2006 | Geerlings et al. | |
| 2006/0232376 A1 | 10/2006 | Blaker | |
| 2006/0234670 A1 | 10/2006 | Blaker et al. | |

FOREIGN PATENT DOCUMENTS

| | | |
|---|---|---|
| EP | 1 052 608 A1 | 11/2000 |
| FR | 2 792 444 | 10/2000 |
| GB | 2171545 A | 8/1986 |
| GB | 2 182 790 A | 10/1986 |
| GB | 2 302 751 A | 6/1996 |
| GB | 2 336 433 | 4/1999 |
| GB | 2335773 A | 9/1999 |
| GB | 2 366 433 A | 5/2000 |
| WO | WO 94/02920 | 7/1993 |
| WO | WO 00/29699 | 5/2000 |
| WO | WO 00/70577 | 11/2000 |
| WO | WO 02/080129 A2 | 10/2002 |
| WO | WO 2004/043750 A2 | 5/2004 |
| WO | WO 2004/077729 A2 | 9/2004 |
| WO | WO 2004/104966 A2 | 12/2004 |
| WO | WO 2004/104966 A3 | 12/2004 |

OTHER PUBLICATIONS

HomeLink Wireless Control System Lighting Kit Installation, http://www.homelink.com/print/lighting_print.html.

HomeLink Wireless Control System Frequently Asked Questions, http://www.homelink.com/print/faq_print.html.

HomeLink Universal 2 Channel Receiver Model PR433-2, Installation Instructions, 114A2437, 2000.

Getting Started with HomeLink, Programming Garage Door Openers and Gates.

HomeLink Universal Transceiver Lighting Package Programming.

Microchip HCS360 Keeloq Code Hopping Encoder, Microchip Technology Inc., DS40152E, 2002.

Microchip TB003, An Introduction to Keeloq Code Hopping, Microchip Technology Inc., DS91002A, 1996.

Chamberlain LiftMaster Professional Universal Receiver Model 635LM Owner's Manual, 114A2128C, The Chamberlain Group, Inc., 2002.

Flash2Pass eliminates past garage door opener hassles using a secure and easy-to-install system, Press Release, F2P Electronics, Inc., Jan. 2002.

Flash2Pass Easy Set up Instructions, v031003, F2P Technologies.

The X-10 Powerhouse Power Line Interface Model #PL513 and Two-Way Power Line Interface Model #TW523, Technical Note, Dave Rye, Rev. 2.4, PL/TWTN/1291.

Neural Networks for ECCM, Simon Haykin, McMaster University Communications Research Laboratory Technical Report 282, Neurocomputing for Signal Processing, Feb. 1994, http://www.crl.mcmaster.ca/cgi-bin/makerabs.pl?282.

DRFM Theory of Operation, KOR Electronics, Inc., http://www.korelectronics.com/product_sheets/theory-of-operations/drfm-theoryofop.htm.

Fabrication Process Combines Low Cost and High Reliability, Murat Eron, Richard J. Perko and R. James Gibson, Microwaves & RF, Oct. 1993.

Pager and Garage Door Opener Combination, Gail Marino, Motorola Technical Developments, vol. 10, Mar. 1990.

Search and Examination Report Under Sections 17 and 18(3), Sep. 25, 2003.

Combined Search and Examination Report Under Sections 17 and 18 (3) mailed Nov. 30, 2004 for the corresponding European patent application GB 0415908.3.

Combined Search and Examination Report Under Sections 17 and 18(3) mailed Nov. 2, 2004 for European patent application GB0416753.2.

Combined Search and Examination Report Under Sections 17 and 18(3) mailed Nov. 2, 2004 for European patent application GB 0416789.6.

Combined Search and Examination Report Under Sections 17 and 18(3) for European Application No. GB 0416742.5 dated Oct. 26, 2004.

German Search/Examination Document, German patent Application No. 103 14 228.2, Dec. 14, 2004.

* cited by examiner

RADIO RELAY APPLIANCE ACTIVATION

BACKGROUND OF THE INVENTION

1. Field of the Invention

The present invention relates to remote control of appliances such as, for example, garage door openers.

2. Background Art

Home appliances, such as garage door openers, security gates, home alarms, lighting, and the like, may conveniently be operated from a remote control. Typically, the remote control is purchased together with the appliance. The remote control transmits a radio frequency activation signal which is recognized by a receiver associated with the appliance. Aftermarket remote controls are gaining in popularity as such devices can offer functionality different from the original equipment remote control. Such functionality includes decreased size, multiple appliance interoperability, increased performance, and the like. Aftermarket controllers are also purchased to replace lost or damaged controllers or to simply provide another remote control for accessing the appliance. An example application for aftermarket remote controls are remote garage door openers integrated into an automotive vehicle. These integrated remote controls provide customer convenience, appliance interoperability, increased safety, and enhanced vehicle value.

Present in-vehicle integrated remote controls provide a "universal" or programmable garage door opener which learns characteristics of an existing transmitter then, when prompted by a user, generates an activation signal having the same characteristics. One problem with such devices is the need to put a complex electronic device within the vehicle, where space is a premium. Another problem with such devices is the requirement that they operate together with existing remote controls. Yet another problem is the difficulty experienced by users programming such devices to work with existing garage door opener receivers.

Another solution is to purchase a second receiver compatible with a new transmitter and then hard wire the second receiver into the existing garage door opener circuit. Such installation is beyond the capabilities of some users.

What is needed is a universal remote controller that does not require complex electronics within the vehicle, is compatible with existing transmitters, is more easily set up by a vehicle owner and does not require wiring into the garage door opener circuitry.

SUMMARY OF THE INVENTION

The present invention provides a relay between radio frequency transmission schemes having different characteristics.

A system for controlling an appliance is provided. A radio receiver receives radio frequency control signals for controlling the appliance. The controlling radio frequency signals have predetermined receiver characteristics. Each of at least one existing radio frequency transmitter is specifically designed to transmit wireless radio frequency control signals having these predetermined receiver characteristics to the radio receiver. A new wireless radio frequency transmitter has predetermined transmitter characteristics, at least one of which is not compatible with the radio receiver. A radio relay learns the receiver characteristics from one of the existing transmitters and learns at least one transmitter characteristic from the new transmitter. Then, when an appliance radio frequency activation command is received from the new transmitter, the radio relay transmits a new radio frequency appliance activation command having the learned receiver characteristics.

In an embodiment of the present invention, the radio relay determines as one of the receiver characteristics whether the receiver operates using a fixed code or a variable code. If the receiver operates using a fixed code, the radio relay stores the fixed code. Other possible learned receiver characteristics include carrier frequency, code word, type of code, transmitter identifier, and the like.

In another embodiment of the present invention, the radio frequency control signals received by the radio receiver contain a rolling code. The receiver ignores control signals having a rolling code value within a rear window of possible rolling code values. The radio relay transmits radio frequency control signals to the radio receiver so as to place the existing transmitter from which the radio relay learned the receiver characteristics into the receiver rolling code value rear window. If the radio relay then receives a transmission from the existing transmitter, the radio relay may transmit a radio frequency control signal to the receiver having a rolling code value outside of the receiver rolling code value rear window.

In still another embodiment of the present invention, the radio relay determines from a radio frequency command received from the new transmitter whether the command is for a first appliance or a second appliance. The second appliance may be remotely controlled either wirelessly or through wired connections.

A method for controlling an appliance is also provided. A radio transmission is received from an existing wireless radio frequency transmitter transmitting radio frequency signals having a first set of transmission characteristics. Data representing these transmission characteristics is stored. A radio transmission from a new wireless transmitter is received. The new transmitter transmits radio frequency signals having a second set of transmission characteristics different from the first set of transmission characteristics. Data representing at least one characteristic from the second set of transmission characteristics is stored. An activation request is received from the new transmitter. The activation request is transmitted to the appliance with a radio frequency signal based on the first set of transmission characteristics.

A universal garage door opener is also provided. The garage door is controlled by a radio frequency receiver responsive to an existing radio frequency transmitter. The receiver responds to an activation signal sent by the existing transmitter having a first set of signal characteristics. The garage door opener includes a wireless radio frequency receiver receiving radio frequency control signals transmitted with any one of a plurality of signal characteristics including the first set of signal characteristics. A wireless radio frequency transmitter transmits radio frequency control signals having any one of the plurality of signal characteristics. Control logic in communication with the receiver, the transmitter and a user interface switches to a learn mode in response to the user interface. While in the learn mode, an activation signal transmitted by the existing transmitter is received and the first set of signal characteristics is determined. In an operate mode, an activation request is received from a radio frequency signal having a second set of signal characteristics. The activation request is transmitted with a radio frequency signal having the first set of signal characteristics.

In an embodiment of the present invention, the control logic assigns one of a plurality of channels to the first set of signal characteristics, thereby allowing the universal garage door opener to operate a plurality of radio frequency devices.

In still another embodiment of the present invention, the garage door opener includes a second transmitter for transmitting signals through AC wiring. The control logic associates a received activation request with an appliance interconnected to the garage door opener through the AC wiring.

The above features, and other features and advantages of the present invention are readily apparent from the following detailed descriptions thereof when taken in connection with the accompanying drawings.

DETAILED DESCRIPTION OF THE PREFERRED EMBODIMENTS

Figure 1:
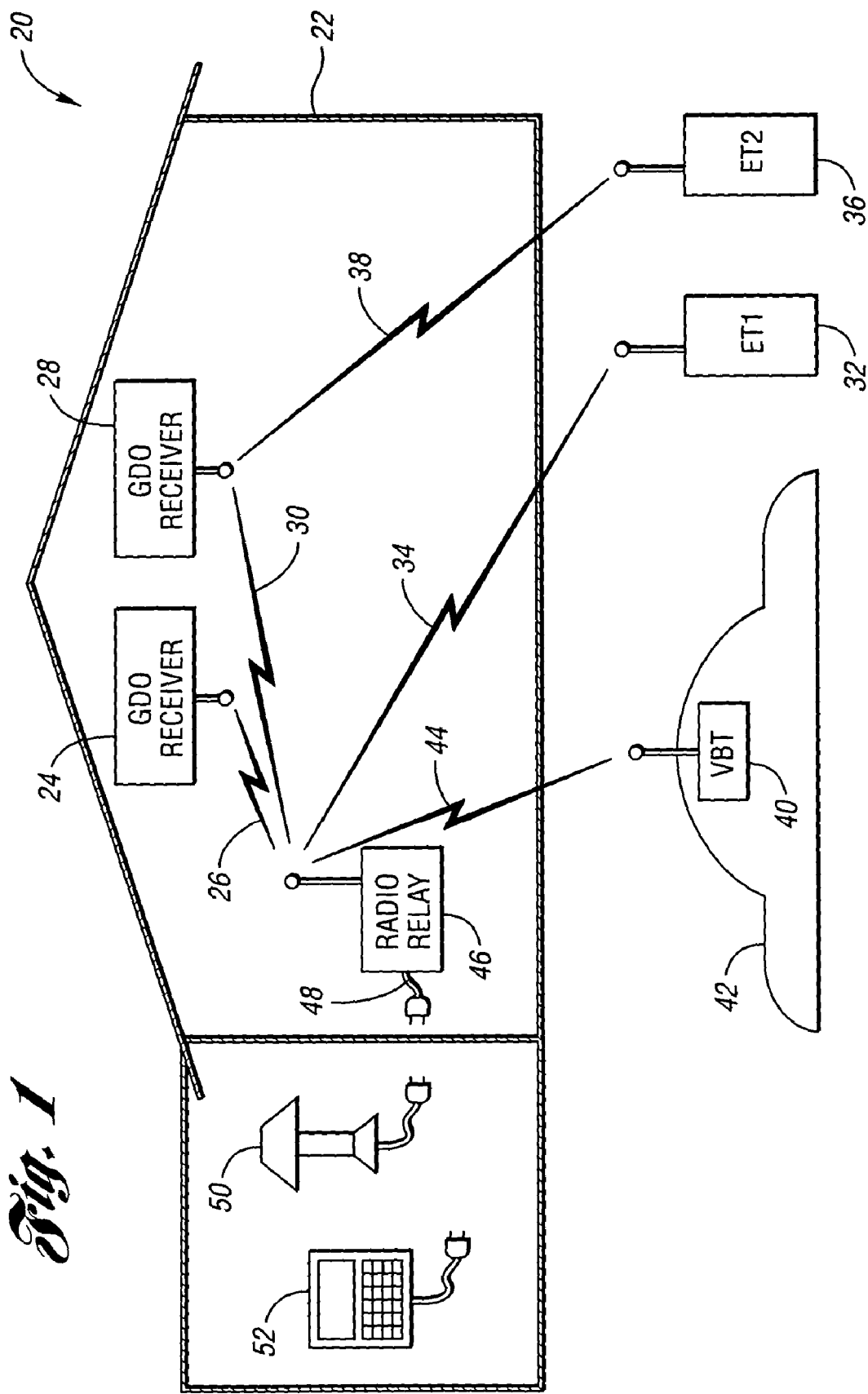
FIG. 1 is a block diagram illustrating an appliance control system according to an embodiment of the present invention.

Referring to FIG. 1, a block diagram illustrating an appliance control system according to an embodiment of the present invention is shown. An appliance control system, shown generally by 20, allows one or more appliances to be remotely controlled using radio transmitters. In the example shown, radio frequency remote controls are used to operate garage door openers. However, the present invention may be applied to controlling a wide variety of appliances such as other mechanical barriers, lighting, alarm systems, temperature control systems, and the like.

Appliance control system 20 includes garage 22 having two garage doors, not shown. First garage door opener (GDO) receiver 24 receives radio frequency control signals 26 for controlling a first garage door opener. First received control signals 26 have predetermined receiver characteristics for operation with GDO receiver 24. Garage 22 also includes second GDO receiver 28 receiving radio frequency control signals 30 for controlling a second garage door opener. Second received control signals 30 also have predetermined receiver characteristics that may be the same or different from those for first received control signals 26. First existing transmitter (ET1) 32 transmits wireless radio frequency control signals 34 having predetermined receiver characteristics compatible with GDO receiver 24. Second existing transmitter (ET2) 36 transmits wireless radio frequency control signals 38 having predetermined receiver characteristics compatible with second GDO receiver 28.

A user of appliance control system 20 may wish to add a new transmitter to system 20. For example, vehicle-based transmitter 40 may be installed in vehicle 42, which may be parked in garage 22. Vehicle-based transmitter 40 generates new transmitted control signals 44 having at least one characteristic making new transmitted control signals 44 not compatible with at least one of GDO receiver 24 and GDO receiver 28.

Appliance control system 20 includes radio relay 46 capable of learning characteristics of first transmitted control signals 34 from first existing transmitter 32, second transmitted control signals 38 from second existing transmitter 36, or both. Radio relay 46 also learns at least one characteristic of new transmitted control signals 44 from vehicle-based transmitter 40. When radio relay 46 receives an appliance radio frequency activation command from vehicle-based transmitter 40, radio relay 46 transmits a new radio frequency appliance activation command to GDO receiver 24 or GDO receiver 28 using the characteristics of first received control signals 26 or second received control signals 30, respectively.

The operation of existing transmitters 32, 36 following the addition of radio relay 46 may vary depending upon the characteristics of transmitted control signals 34, 38. For some implementations, existing transmitter 36 will still directly affect the operation of receiver 28. In other implementations, radio relay 46 will inhibit the direct activation of receiver 24 by existing transmitter 32. Radio relay 46 will respond to activation signals from existing transmitter 32 by transmitting a new activation signal to receiver 24.

Radio relay 46 may include AC connector 48 through which radio relay 46 receives electrical power. Radio relay 46 may be programmed to send a radio frequency activation signal through AC connector 48 based on an activation signal received from vehicle-based transmitter 40 and/or existing transmitter 32, 36. In this manner, one or more appliances linked to radio relay 46 through a power grid such as, for example, lamp 50, alarm system 52, and the like, can be remotely controlled.

Figure 2:
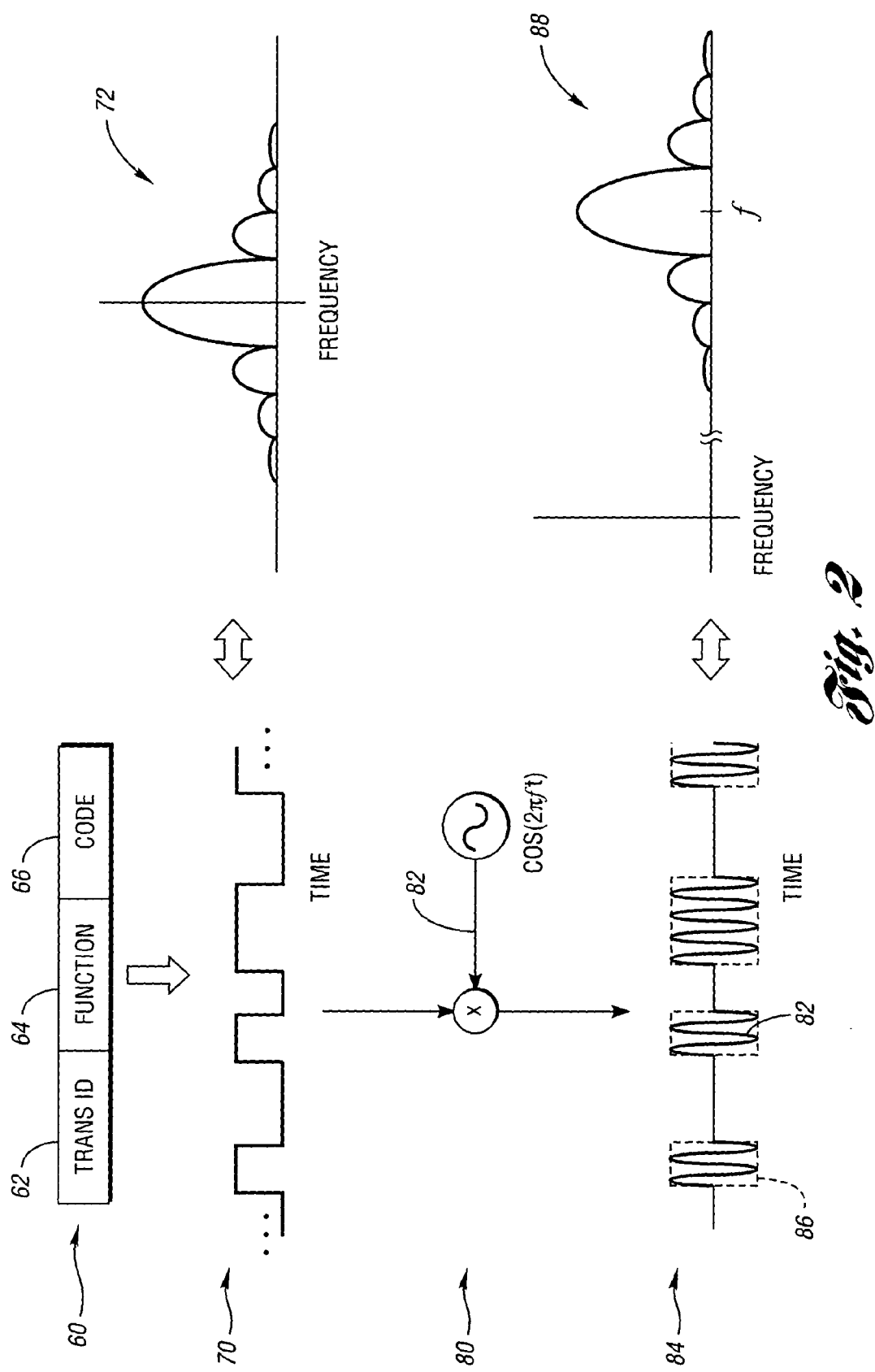
FIG. 2 is a schematic diagram illustrating activation signal characteristics according to an embodiment of the present invention.

Referring now to FIG. 2, a schematic diagram illustrating activation signal characteristics according to an embodiment of the present invention is shown. Information transmitted in an activation signal is typically represented as a binary data word, shown generally by 60. Data word 60 may include one or more fields, such as transmitter identifier 62, function indicator 64, code word 66, and the like. Transmitter identifier (TRANS ID) 62 uniquely identifies a remote control transmitter. Function indicator 64 indicates which of a plurality of functional buttons on the remote control transmitter were activated. Code word 66 helps to prevent misactivation and unauthorized access.

Several types of codes 66 are possible. One type of code is a fixed code, wherein each transmission from a given remote control transmitter contains the same code 66. In contrast, variable code schemes change the bit pattern of code 66 with each activation. The most common variable code scheme, known as rolling code, generates code 66 by encrypting a counter value. After each activation, the counter is incremented. The encryption technique is such that a sequence of encrypted counter values appears to be random numbers.

Data word 60 is converted to a baseband stream, shown generally by 70, which is an analog signal typically transitioning between a high voltage level and a low voltage level. Various baseband encoding or modulation schemes are possible, including polar signaling, on-off signaling, bipolar signaling, duobinary signaling, Manchester signaling, and the like. Baseband stream 70 has a baseband power spectral density, shown generally by 72, centered around a frequency of zero.

Baseband stream 70 is converted to a radio frequency signal through a modulation process shown generally by 80. Baseband stream 70 is used to modulate one or more characteristics of carrier 82 to produce a broadband signal, shown generally by 84. Modulation process 80, mathematically illustrated in FIG. 2, implements a form of amplitude modulation commonly referred to as on-off keying. As will be recognized by one of ordinary skill in the art, many other modulation forms are possible, including frequency modulation, phase modulation, and the like. In the example shown, baseband stream 70 forms envelope 86 modulating carrier 82. As illustrated in broadband power spectral density 88, the effect in the frequency domain is to shift baseband power spectral density 72 to be centered around the carrier frequency, f, of carrier 82.

Figure 3:
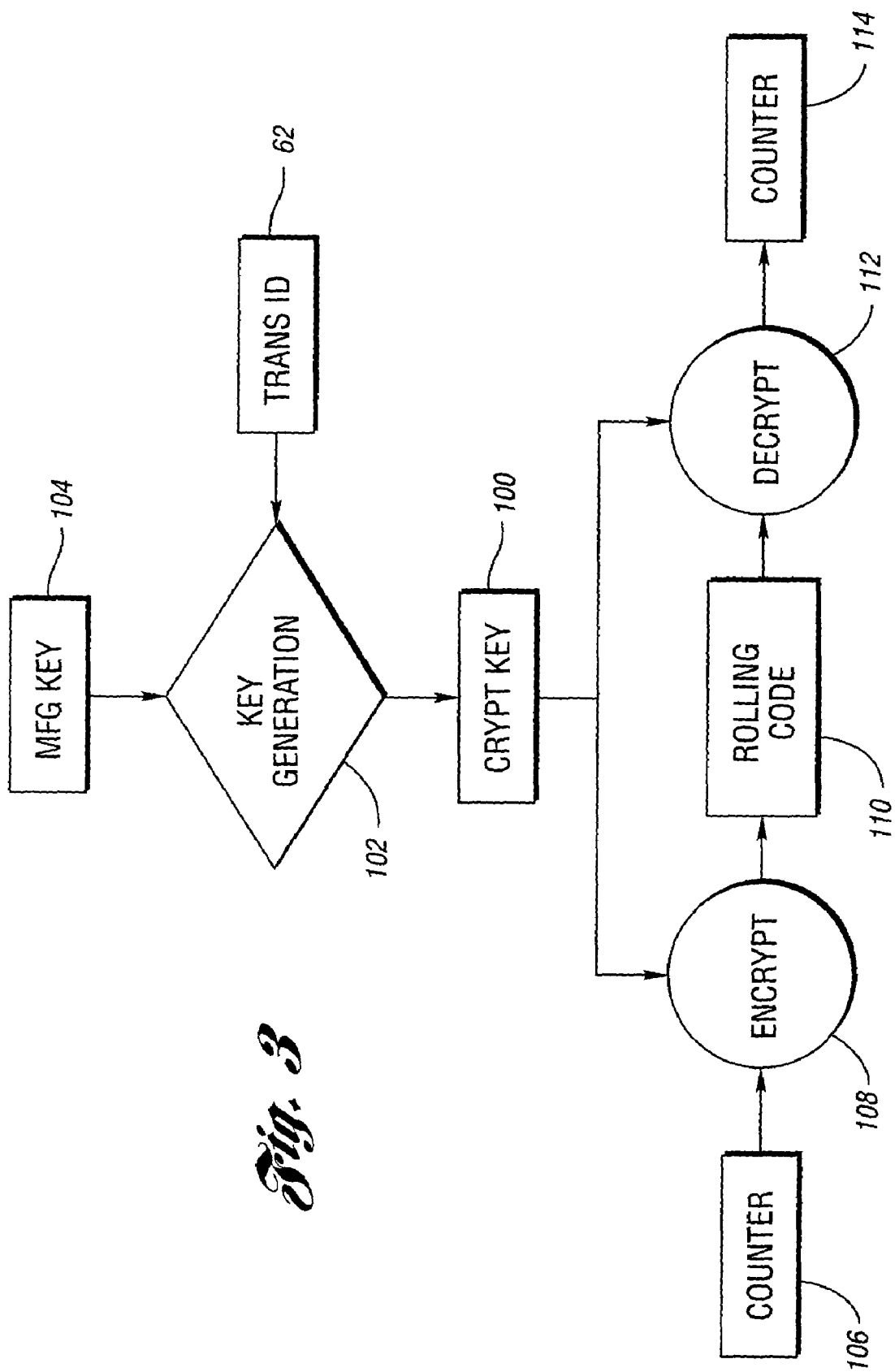
FIG. 3 is a block diagram illustrating rolling code operation that may be used with the present invention.

Referring now to FIG. 3, a block diagram illustrating rolling code operation that may be used with the present invention is shown. Remotely controlled systems using rolling code require crypt key 100 in both the transmitter and the receiver for normal operation. In a well-designed rolling code scheme, crypt key 100 is never transmitted from the transmitter to the receiver. Typically, crypt key 100 is generated using key generation algorithm 102 based on transmitter identifier 62 and a manufacturing (MFG) key 104. Crypt key 100 and transmitter identifier 62 are then stored in a particular transmitter. Counter 106 is also initialized in the transmitter. Each time an activation signal is sent, the transmitter uses encrypt algorithm 108 to generate rolling code 110 from counter 106 using crypt key 100. The transmitted activation signal includes rolling code 110 and transmitter identifier 62.

A rolling code receiver is trained to a compatible transmitter prior to operation. The receiver is placed into a learn mode. Upon reception of an activation signal, the receiver extracts transmitter identifier 62. The receiver then uses key generation algorithm 102 with manufacturing key 104 and received transmitter identifier 62 to generate crypt key 100 identical to the crypt key used by the transmitter. Newly generated crypt key 100 is used by decrypt algorithm 112 to decrypt rolling code 110, producing counter 114 equal to counter 106. The receiver then saves counter 114 and crypt key 100 associated with transmitter identifier 62. As is known in the encryption art, encrypt algorithm 108 and decrypt algorithm 112 may be the same algorithm.

In normal operation, when the receiver receives an activation signal, the receiver first extracts transmitter identifier 62 and compares transmitter identifier 62 with all learned transmitter identifiers. If no match is found, the receiver rejects the activation signal. If a match is found, the receiver retrieves crypt key 100 associated with received transmitter identifier 62 and decrypts rolling code 110 from the received activation signal to produce counter 114. If received counter 106 matches counter 114 associated with transmitter identifier 62, activation proceeds. As will be discussed in greater detail below, received counter 106 may also exceed stored counter 114 by a preset amount for successful activation.

Another rolling code scheme generates crypt key 100 based on manufacturing key 104 and a "seed" or random number. An existing transmitter sends this seed to an appliance receiver when the receiver is placed in learn mode. The transmitter typically has a special mode for transmitting the seed entered, for example, by pushing a particular combination of buttons. The receiver uses the "seed" to generate crypt key 100. As will be recognized by one of ordinary skill in the art, the present invention applies to the use of a "seed" for generating a crypt key as well as to any other variable code scheme.

Figure 4:
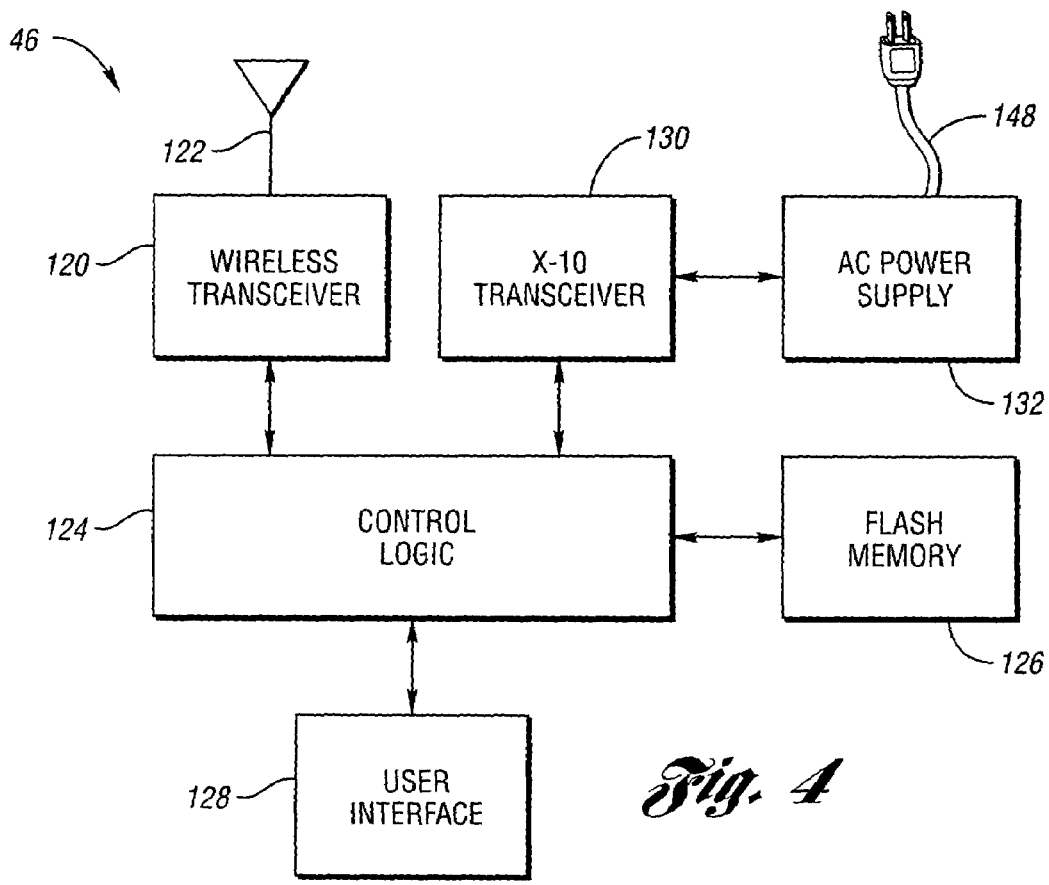
FIG. 4 is a block diagram illustrating an appliance controller according to an embodiment of the present invention.

Referring now to FIG. 4, a block diagram illustrating an appliance controller according to an embodiment of the present invention is shown. Radio relay 46 includes wireless transceiver 120 transmitting and receiving wireless signals through antenna 122. Wireless transceiver 120 forwards demodulated data to control logic 124 and receives data from control logic 124 for modulation. Control logic 124 can extract activation signal characteristics from received data and/or may receive characteristics directly from wireless transceiver 120. Control logic 124 stores characteristics in non-volatile memory such as flash memory 126. User interface 128 forwards user input to control logic 124 and receives commands from control logic 124 to provide user output. Control logic 124 is preferably implemented as a microcontroller. However, control logic 124 may be implemented with any combination of discrete logic, analog electronic components, programmable logic, microprocessors, and the like. In addition, various components illustrated in FIG. 4 may be included on a single integrated circuit for decreased cost in mass production.

Radio relay 46 may also include X-10 transceiver 130 for sending and receiving radio frequency signals over a power grid such as residential wiring. X-10 is a standard defining a signal which includes a pattern of 1 msec bursts of a 120 kHz carrier synchronized with the zero crossings of an AC power signal. Circuitry implementing the X-10 standard is well known in the art and includes the TW523 two-way power line interface from X-10 Inc., Closter, N.J. X-10 transceiver 130 interfaces with AC power supply 132 to achieve signal transmission over AC connector 48. AC power supply 132 also supplies electrical power for the remaining elements of radio relay 46.

Figure 5:
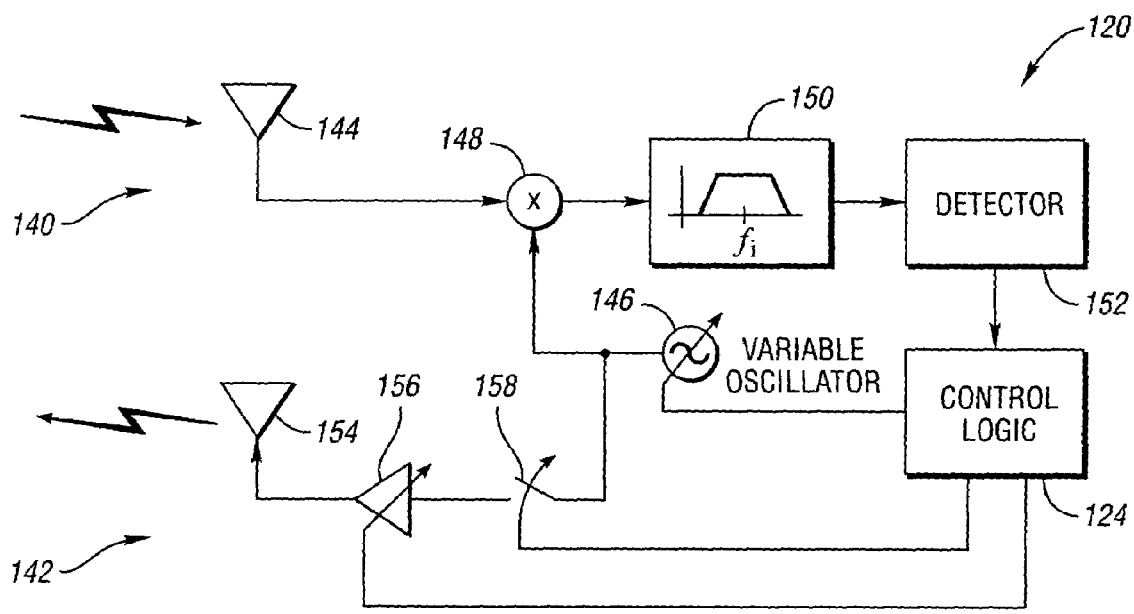
FIG. 5 is a block diagram of a wireless transceiver that may be used to implement the present invention.

Referring now to FIG. 5, a block diagram of a wireless transceiver that may be used to implement the present invention is shown. Wireless transceiver 120 includes a receiver section, shown generally by 140, and a transmitter section, shown generally by 142. Receiver section 140 includes antenna 144, variable oscillator 146, mixer 148, intermediate filter 150, detector 152 and control logic 124. A radio frequency signal is received by antenna 144. Mixer 148 accepts the received signal and a carrier frequency sinusoid from variable oscillator 146. Mixer 148 remodulates the received signal so that the broadband spectrum is centered about frequencies which are the sum and difference of the received signal carrier frequency and the variable oscillator carrier frequency. Control logic 124 varies the frequency of variable oscillator 146 until one of the remodulated components falls within the bandwidth of fixed, narrow band intermediate filter 150. Filter 150 passes this component and rejects all other signals. As will be recognized by one of ordinary skill in the art, receiver 140 functions as a superheterodyne receiver. Detector 152 converts the filtered signal into a baseband signal. Detector 152 may be implemented as a simple envelope detector. When control logic 124 receives valid data from detector 152, variable oscillator 146 is tuned to permit a received signal to pass through intermediate filter 150. If control logic 124 knows the intermediate frequency of filter 150, control logic 124 can determine the carrier frequency of the received signal.

Transmitter section 142 includes antenna 154, which may be the same as antenna 144, variable gain amplifier 156, modulator 158, variable oscillator 146 and control logic 124. For transmitting, control logic 124 sets variable oscillator 146 to the desired carrier frequency. Control logic 124 then modulates the carrier frequency with modulator 158, here modeled as a switch. Control logic 124 sets variable gain amplifier 156 to provide the maximum allowed signal strength. The amplified signal is transmitted by antenna 154.

Components which make up wireless transceiver 120 in FIG. 5 are well known in the art of radio communications. Examples of circuits which may be used to implement wireless transceiver 120 can be found in U.S. Pat. No. 5,614,891, titled Vehicle Accessory Trainable Transmitter; U.S. Pat. No. 5,661,804, titled Trainable Transceiver Capable of Learning Variable Codes; and U.S. Pat. No. 5,686,903, titled Trainable RF Transceiver; each of which is herein incorporated by reference in their entirety.

Figure 6:
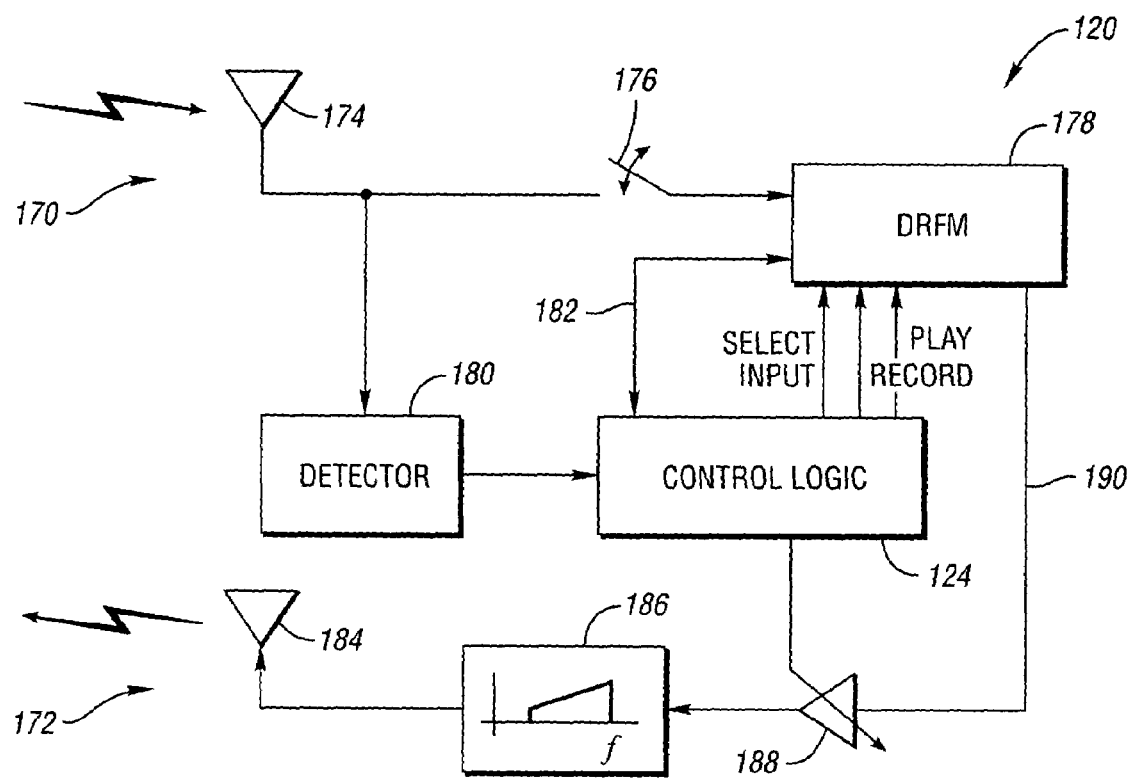
FIG. 6 is a block diagram of an alternative wireless transceiver that may be used to implement the present invention.

Referring now to FIG. 6, a block diagram of an alternative wireless transceiver that may be used to implement the present invention is shown. Wireless transceiver 120 includes receiver section 170 and transmitter section 172. Receiver section 170 includes antenna 174, sampler 176, digital radio frequency memory (DRFM) 178, detector 180 and control logic 124. Control logic 124 monitors the output of detector 180, which receives input from antenna 174. When control logic 124 detects valid data from detector 180, control logic 124 waits until a period when the carrier is present on the signal received with antenna 174. Control logic 124 asserts the "record" input to DRFM 178. By asserting "play" and "select," control logic 124 can shift the sampled carrier from DRFM 178 into control logic 124 over bus 182.

Transmitter section 172 includes antenna 184, which may be the same as antenna 174, filter 186, variable gain amplifier 188, DRFM 178 and control logic 124. Control logic 124 can load DRFM 178 with a sampled carrier stream by asserting "select" and "record," then shifting the carrier stream into DRFM 178 on bus 182. The bit stream representing a carrier may have been previously received and sampled or may be preloaded into control logic 124. Control logic 124 generates a modulated carrier on DRFM output 190 by asserting the "play" control line with the desired data word. The amplitude modulated signal on DRFM output 190 is amplified by variable gain amplifier 188 and filtered by filter 186 before transmission by antenna 184.

A DRFM transceiver similar to the system pictured in FIG. 6 is described in U.S. patent application Ser. No. 10/306,077, titled Programmable Transmitter And Receiver Including Digital Radio Frequency Memory, filed Nov. 27, 2002, now U.S. Pat. No. 7,116,242, which is herein incorporated by reference in its entirety.

Figure 7:
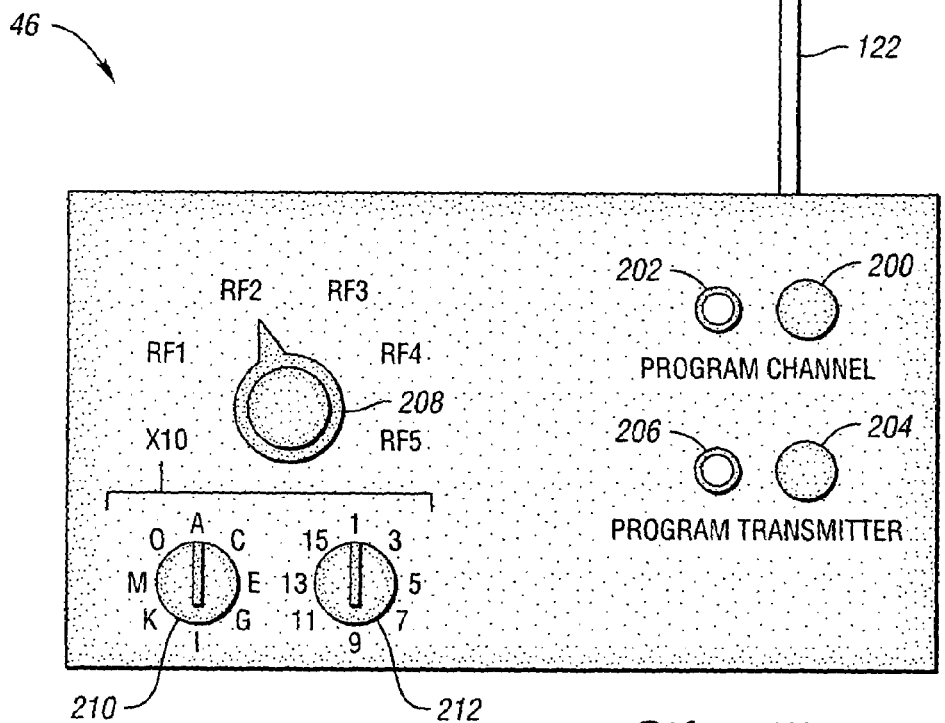
FIG. 7 is a schematic diagram of a user interface according to an embodiment of the present invention.

Referring now to FIG. 7, a schematic diagram of a user interface according to an embodiment of the present invention is shown. Radio relay 46 includes channel pushbutton 200, channel indicator lamp 202, transmitter pushbutton 204, transmitter indicator lamp 206, channel selector switch 208, X-10 house switch 210 and X-10 unit switch 212. Channel pushbutton 200 is used to program radio relay 46 to a particular appliance. The user begins by setting channel selector switch 208 to the appropriate channel. The embodiment illustrated has five wireless channels (RF1–RF5) and one X-10 channel. If channel selector switch 208 is set to a wireless channel, and channel pushbutton 200 is pushed, channel indicator lamp 202 will flash indicating radio relay 46 is waiting to receive an activation signal from an existing transmitter. The user then activates an existing transmitter. Radio relay 46 receives the activation signal on antenna 122 and stores characteristics of the received signal necessary to activate the controlled appliance. If the appliance activation signal was received and characteristics properly stored, channel indicator lamp 202 will glow steadily to indicate successful wireless channel training.

If the appliance is to be controlled through the power grid, channel selector switch 208 is set to X-10. X-10 house switch 210 and X-10 unit switch 212 are set to match the corresponding house switch and unit switch of an X-10 receiver module connected to the controlled appliance. The user then pushes channel pushbutton 200. Radio relay 46 associates house switch 210 and unit switch 212 settings with channel X-10. Channel indicator lamp 202 then glows steadily to indicate success.

Any time after the channel is programmed, the user may associate a new transmitter with the channel. The user sets channel selector switch 208 to the desired channel and pushes transmitter pushbutton 204. Transmitter indicator lamp 206 then flashes indicating radio relay is ready for transmitter programming. The user then activates the new transmitter. Radio relay 46 receives the activation signal on antenna 122 and stores at least one characteristic of the received signal associated with the selected channel. Radio relay 46 then turns on transmitter indicator lamp 206 for a short period to indicate success.

Figure 8:
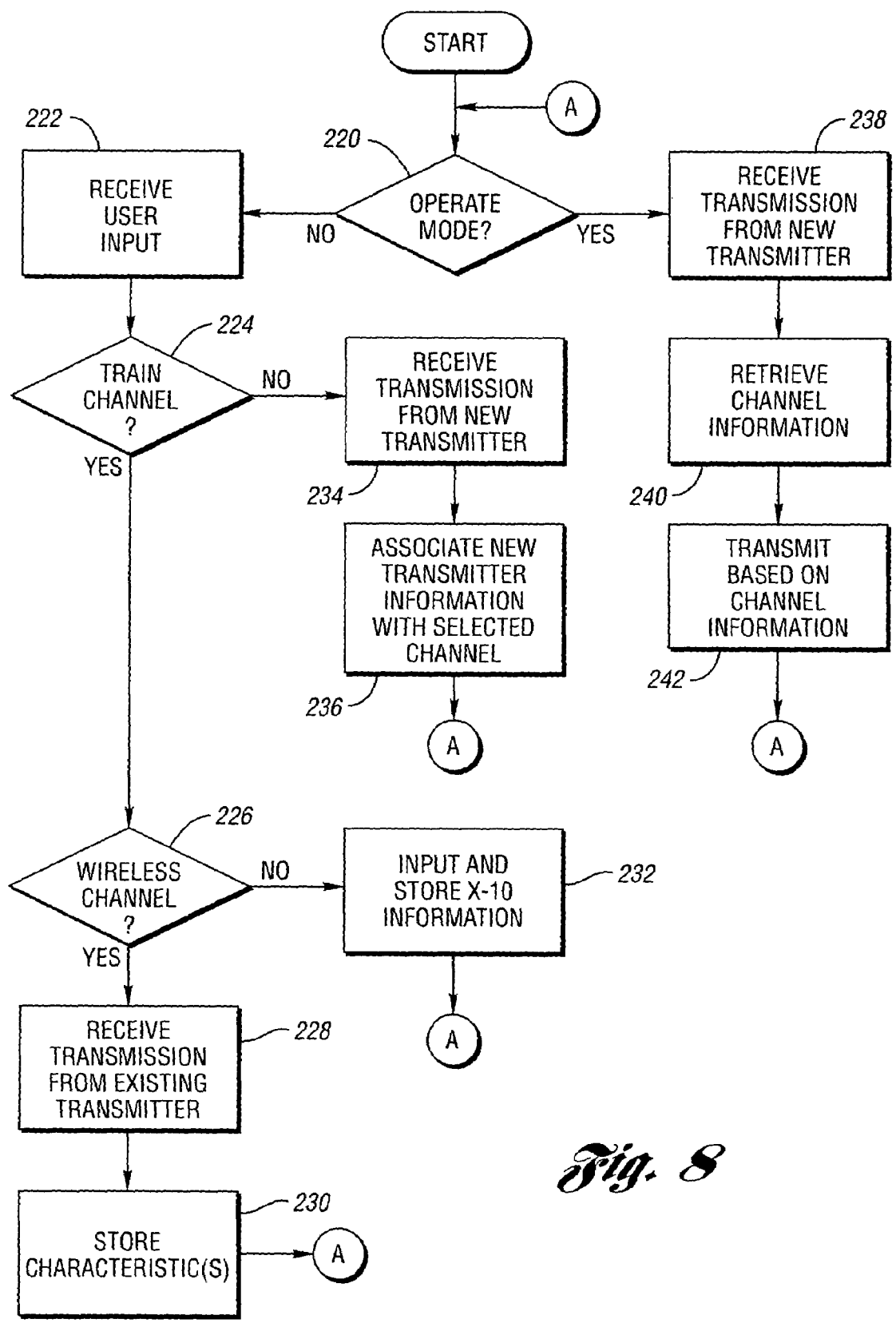
FIG. 8 is a flow diagram illustrating radio relaying according to an embodiment of the present invention.

Referring now to FIG. 8, a flow diagram illustrating radio relaying according to an embodiment of the present invention is shown. As will be appreciated by one of ordinary skill in the art, the operations illustrated are not necessarily sequential operations. Similarly, operations may be performed by software, hardware, or a combination of both. The present invention transcends any particular implementation and the aspects are shown in sequential flow chart form for ease of illustration.

The radio relay functions in one of two modes, as indicated by block 220. The default mode is operate mode. The radio relay may be placed into learn mode through the user interface as described with regard to FIG. 7 above. In addition, a switch may be provided to allow the user to specifically place the radio relay in either learn mode or operate mode. The radio relay may switch from learn mode to operate mode upon completion of a learn operation, after a timeout period, upon receiving specific user input, or the like.

If the radio relay is in learn mode, user input is received, as in block 222. A check is made to determine if a channel is being trained, as in block 224. This check may be based on user input. If so, a check is made to determine whether or not the channel to be trained is a wireless channel, as in block 226. This determination may also be based upon user input. If a wireless channel is being trained, the radio relay waits to receive transmission from an existing transmitter, as in block 228. This transmission may include one or more of transmitter identifier 62, a random number or "seed" value, fixed or rolling code 66, function code 64, and the like. If a valid transmission is received, the radio relay stores characteristics of the existing transmitter, as in block 230. For rolling code systems, if the radio relay stores the same transmitter identifier as the existing transmitter, the radio relay becomes a clone of the existing transmitter. Operation of such a radio relay is described with regard to FIG. 9 below. Alternatively, the radio relay can create a new transmitter identifier to be stored as a characteristic of the existing transmitter. The rolling code receiver can then be trained to the radio relay. This allows a receiver to recognize the existing transmitter and the radio relay as separate transmitters.

If the channel being trained is not a wireless channel, the radio relay inputs and stores X-10 information, as in block 232. This information can include the house and unit selections input by the user. As will be recognized by one of ordinary skill in the art, other types of channels may also be trained.

Returning to block 224, the radio relay may be programmed to a new transmitter. The radio relay waits to receive a transmission from the new transmitter, as in block 234. If the received transmission is valid, the radio relay associates the new transmitter information with the selected channel, as in block 236. A wide variety of new transmitters may be trained in this manner. The new transmitter may be vehicle-based, wall mounted, or handheld. The radio relay may learn an entire set of operating characteristics from the new transmitter. Alternatively, or in addition, the radio relay may assume all but at least one characteristic, which is learned from the new transmitter. This characteristic may be, for example, the transmitter identifier. The radio relay may test the assumption that only at least one characteristic must be learned by examining the activation signal received from the new transmitter to determine the transmitter type.

Considering again block 220, if the radio relay is in operate mode, the radio relay waits to receive a transmission from a transmitter in block 238. If a valid transmission is received, the radio relay retrieves channel information associated with the transmitter. This may be done, for example, by associating the transmitter identifier for each transmitter with the characteristics required to activate the appliance controlled by that channel. The radio relay then transmits based on the retrieved channel information, as in block 242.

Figure 9:
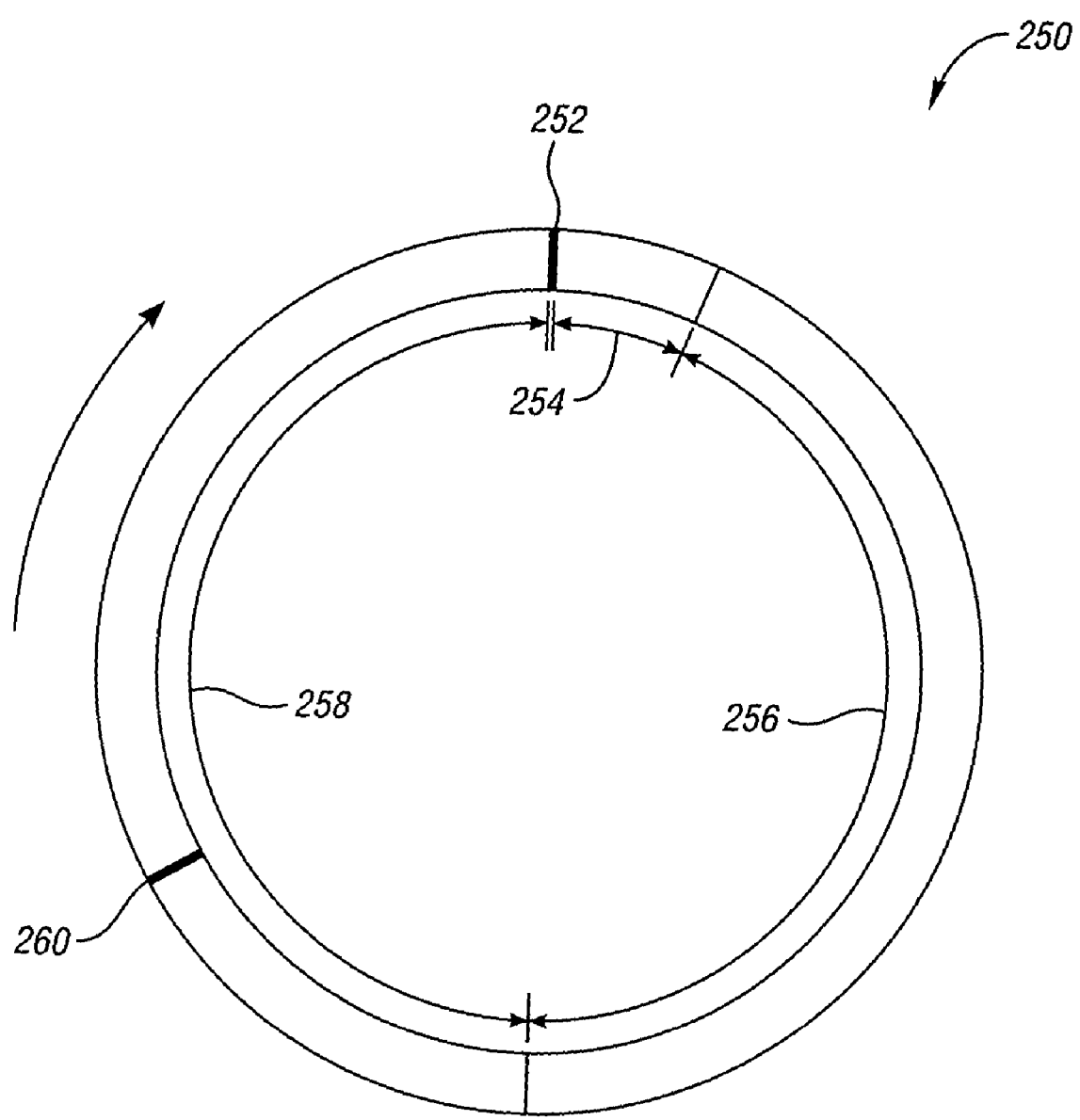
FIG. 9 is a schematic diagram of rolling code windowing according to an embodiment of the present invention.

Referring now to FIG. 9, a schematic diagram of rolling code windowing according to an embodiment of the present invention is shown. A code wheel, shown generally by 250, represents the set of possible counter values or corresponding rolling code values for a particular rolling code scheme. This set of values may be represented as a circle or wheel due to the finite number of bits used to express the counter value or rolling code value. Thus, if the counter or rolling code value is incremented enough times, the set will cycle back to the original value. The cyclic nature of the value set is used to advantage by rolling code receivers.

Code wheel 250 within an appliance receiver can be subdivided into four groups. The first group is a single value, represented by present receiver value 252. Present receiver value 252 is the current value of counter or rolling code expected in the next reception of an activation signal. In association with each received activation signal, present receiver value 252 advances to the next spot in code wheel 250. This may be represented in FIG. 9 by a clockwise movement of present receiver value 252 around code wheel 250. Alternatively, code wheel 250 can be thought to rotate in a counterclockwise direction keeping present receiver value 252 in the top position on FIG. 9. A second group of values is contained in forward window 254. Values in forward window 254 immediately follow present receiver value 252 in the sequence of code wheel 250. A third group of values are contained in resynchronization window 256 sequentially following forward window 254. A fourth set of values are contained in rear window 258. Values in rear window 258 immediately precede present receiver value 252. In the illustration shown, values in rear window 258 begin at the end of resynchronization window 256. However, there may be a gap of values between resynchronization window 256 and rear window 258.

With reference also to FIG. 3, operation of a typical rolling code receiver is based on comparing a value received in an activation signal with present receiver value 252. The following discussion will reference transmitter counter 106 as the value received in the activation signal and receiver counter 114 as present receiver value 252. However, transmitted rolling code value 110 may also be compared against a present receiver rolling code value.

During normal operation, when a rolling code appliance receiver receives an activation signal, the received transmitter identifier is compared against those known by the receiver. If a match is found, the receiver retrieves receiver counter value 114 and compares this against transmitter counter 106 received in the activation signal. If a match occurs, the appliance is activated. Due to the limited transmission range of radio frequency remote control transmitters, some allowance is made for attempting to activate the transmitter outside the range of the appliance receiver. If the receiver receives transmitter counter value 106 within forward window 254, appliance activation occurs.

An additional acceptance feature is provided by resynchronization window 256. If the appliance receiver receives transmitter counter value 106 within resynchronization window 256, the receiver remembers transmitter counter 106 but does not activate the appliance. If the next transmission received by the appliance receiver contains the next sequential transmitter counter 106, the appliance receiver activates the appliance and resets present receiver value 252 to the second received transmitter counter value 106. Since it is human nature to press a transmitter activation button a second time if the first press did not work, resynchronization window 256 provides a means for safely resynchronizing the remote control transmitter with the appliance receiver.

If the appliance receiver receives transmitter counter value 106 within rear window 258, the receiver ignores the activation signal. This prevents a reflected transmission from twice activating the receiver. In addition, an unauthorized user cannot intercept an activation signal and retransmit the stolen signal to gain access.

An embodiment of the present invention uses code wheel 250 to create a clone of an existing transmitter and permit access to a remotely controlled appliance without having to retrain the rolling code appliance receiver. When learning the characteristics of an existing rolling code transmitter, the radio relay uses the received transmitter identifier 62 to generate crypt key 100 identical to the crypt key in the existing transmitter and the appliance receiver trained to the existing transmitter. The radio relay uses crypt key 100 to decrypt rolling code 110, received in the training signal, to obtain transmitter counter 106. The radio relay advances this counter value to correspond with a value in the trained receiver lying within resynchronization window 256. The radio relay then transmits two sequential transmitter counter values, using characteristics learned from the existing transmitter, to the trained receiver. This places transmitter counter 106 in the existing transmitter within rear window 258 of receiver code wheel 250, as illustrated by existing transmitter value 260. Thus, the appliance receiver will now ignore all transmissions from the existing transmitter used to train the radio relay.

In order to continue effective operation with the existing transmitter, the radio relay will listen for any transmission from the existing transmitter. If such a transmission is received by the radio relay, the radio relay retransmits the activation signal using a counter value expected as present receiver value 252 by the appliance receiver. If the radio relay is no longer needed, the appliance receiver may be retrained to the existing transmitter.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A system for controlling an appliance comprising:
a radio receiver operative to receive radio frequency control signals for controlling the appliance, the controlling radio frequency signals having predetermined receiver characteristics;
at least one existing radio frequency transmitter, each existing transmitter specifically designed to transmit wireless radio frequency control signals having the predetermined receiver characteristics to the radio receiver;
a new wireless radio frequency transmitter having predetermined transmitter characteristics, at least one predetermined transmitter characteristic not compatible with the radio receiver; and
a radio relay operative to
(a) learn the receiver characteristics from one of the at least one existing transmitter,
(b) learn at least one transmitter characteristic from the new transmitter,
(c) receive an appliance radio frequency activation command from the new transmitter, the activation command exhibiting transmitter characteristics, and
(d) transmit a new radio frequency appliance activation command based on the received appliance activation command, the new appliance activation command having the receiver characteristics.

2. The system of claim 1 wherein the radio relay is further operative to determine as one of the receiver characteristics whether the receiver operates using a fixed code or a variable code.

3. The system of claim 2 wherein, if the receiver operates using a fixed code, the radio relay stores the fixed code as one of the receiver characteristics.

4. The system of claim 1 wherein the existing transmitter from which the radio relay learned the receiver characteristics transmits an existing transmitter identifier, the radio relay storing the existing transmitter identifier as one of the receiver characteristics.

5. The system of claim 1 wherein the existing transmitter from which the radio relay learned the receiver characteristics transmits an existing transmitter identifier, the radio relay storing as one of the receiver characteristics a transmitter identifier different from the existing transmitter identifier.

6. The system of claim 1 wherein one of the receiver characteristics is a carrier frequency of the radio frequency control signals.

7. The system of claim 1 wherein one of the receiver characteristics is a code word contained in data modulating a carrier frequency of the radio frequency control signals.

8. The system of claim 1 wherein one of the receiver characteristics is a type of code contained in data modulating a carrier frequency of the radio frequency control signals.

9. The system of claim 1 wherein the radio relay functions as a clone of the existing transmitter from which the radio relay learned the receiver characteristics.

10. The system of claim 1 wherein the radio frequency control signals received by the radio receiver contain a rolling code, the receiver operative to ignore control signals having a rolling code value within a rear window of possible rolling code values, the radio relay transmitting radio frequency control signals to the radio receiver so as to place the existing transmitter from which the radio relay learned the receiver characteristics into the receiver rolling code value rear window.

11. The system of claim 10 wherein the radio relay is operative to receive a transmission from the existing transmitter from which the radio relay learned the receiver characteristics and to transmit a radio frequency control signal to the receiver based on the received transmission, the transmitted radio frequency control signal having a rolling code value outside of the receiver rolling code value rear window.

12. The system of claim 1 wherein the appliance is a first appliance, the system further comprising a second appliance, the radio relay operative to determine from a radio frequency command received from the new transmitter whether the radio frequency command is directed to the first appliance or the second appliance.

13. A method for controlling an appliance, the appliance controlled by radio frequency transmissions from at least one existing radio frequency transmitter, the method comprising:
receiving a radio transmission from an existing wireless radio frequency transmitter, the existing radio frequency transmitter transmitting radio frequency signals having a first set of transmission characteristics;
storing data representing the first set of transmission characteristics;
receiving a radio transmission from a new wireless transmitter, the new transmitter transmitting radio frequency signals having a second set of transmission characteristics different from the first set of transmission characteristics;
storing data representing at least one characteristic from the second set of transmission characteristics;
receiving an activation request from the new transmitter; and
transmitting the activation request to the appliance with a radio frequency signal based on the first set of transmission characteristics.

14. The method of claim 13 wherein transmission characteristics comprises carrier frequency.

15. The method of claim 13 wherein transmission characteristics comprises a transmitter identifier.

16. The method of claim 13 wherein transmission characteristics comprises an indication as to whether the radio transmission contains a fixed code or a variable code.

17. The method of claim 13 further comprising:
determining that the existing radio frequency transmitter transmits a rolling code; and
transmitting at least one radio frequency signal based on the first set of transmission characteristics which places the existing transmitter in a region of rolling code values ignored by the appliance.

18. The method of claim 17 further comprising:
receiving an activation request from the existing transmitter, the activation request having a first rolling code value, the first rolling code value within the region of rolling code values ignored by the appliance; and
transmitting the activation request with a second rolling code value outside the region of rolling code values ignored by the appliance.

19. The method of claim 13 further comprising:
storing data representing a third set of transmission characteristics;
associating the data representing the third set of transmission characteristics with a second appliance; and associating the data representing the third set of transmission characteristics with a particular activation signal received from the new transmitter.

20. A universal garage door opener for opening a garage door, the garage door is controlled by a radio frequency receiver responsive to an existing radio frequency transmitter, the receiver responding to an activation signal sent by the existing transmitter having a first set of signal characteristics, the garage door opener comprising:
   a wireless radio frequency receiver operative to receive radio frequency control signals transmitted with any one of a plurality of signal characteristics including the first set of signal characteristics;
   a wireless radio frequency transmitter operative to transmit radio frequency control signals having any one of the plurality of signal characteristics;
   a user interface; and
   control logic in communication with the receiver, the transmitter and the user interface, the control logic operative to
      (a) switch to a learn mode in response to the user interface,
      (b) while in the learn mode, receive an activation signal transmitted by the existing transmitter,
      (c) determine the first set of signal characteristics from the received activation signal,
      (d) switch to an operate mode,
      (e) receive an activation request from a radio frequency signal having a second set of signal characteristics, and
      (f) transmit the activation request with a radio frequency signal having the first set of signal characteristics.

21. The universal garage door opener as in claim 20 wherein the control logic learns at last one of the second set of signal characteristics by receiving a radio frequency signal from a new transmitter different than existing transmitter.

22. The universal garage door opener as in claim 20 wherein the control logic determines from the activation signal received from the existing transmitter that the receiver operates only when the receiver receives a fixed code, the control logic is further operative to store the fixed code received from the existing transmitter.

23. The universal garage door opener as in claim 20 wherein the control logic determines a transmitter identifier of the existing transmitter from the activation signal received from the existing transmitter, the control logic operative to transmit the activation request with the transmitter identifier.

24. The universal garage door opener as in claim 20 wherein the control logic determines a transmitter identifier of the existing transmitter from the activation signal received from the existing transmitter, the control logic operative to transmit the activation request with a transmitter identifier different from the existing transmitter identifier.

25. The universal garage door opener as in claim 20 wherein the control logic determines from the activation signal received from the existing transmitter that the existing transmitter transmitted a rolling code.

26. The universal garage door opener as in claim 25 wherein the control logic transmits at least one activation signal placing the existing transmitter into a range of rolling code values that will be ignored by the receiver.

27. The universal garage door opener as in claim 26 wherein the control logic determines that a received activation signal is from the existing transmitter and then transmits another activation signal having a rolling code value within a range of rolling code values that will be accepted by the receiver.

28. The universal garage door opener as in claim 20 wherein the control logic is operative to assign one of a plurality of channels to the first set of signal characteristics, thereby allowing the universal garage door opener to operate a plurality of radio frequency devices.

29. The universal garage door opener as in claim 20 further comprising a second transmitter operative to transmit signals through AC wiring, the control logic further operative to associate a received activation request with an appliance interconnected to the universal garage door opener through the AC wiring.

30. A radio relay for controlling at least one appliance, the appliance receiving radio frequency control having predetermined receiver characteristics from at least one existing radio frequency transmitter, the radio relay comprising:
   at least one antenna for receiving and transmitting wireless radio signals;
   a receiver in communication with the at least one antenna;
   a transmitter in communication with the at least one antenna; and
   control logic in communication with the receiver and the transmitter, the control logic operative to
      (a) learn the receiver characteristics from one of the at least one existing transmitter,
      (b) learn at least one transmitter characteristic from a new transmitter based on wireless signals received from the new transmitter, the at least one transmitter characteristic different from any corresponding receiver characteristic,
      (c) receive an appliance radio frequency activation command from the new transmitter, the activation command exhibiting transmitter characteristics, and
      (d) transmit a new radio frequency appliance activation command based on the received appliance activation command, the new appliance activation command having the receiver characteristics.

31. The radio relay of claim 30 wherein the control logic is operative to determine as one of the receiver characteristics whether the receiver operates using a fixed code or a variable code.

32. The radio relay of claim 31 wherein, if the receiver operates using a fixed code, the control logic stores the fixed code as one of the receiver characteristics.

33. The radio relay of claim 30 wherein the existing transmitter from which the radio relay learned the receiver characteristics transmits an existing transmitter identifier, the radio relay storing the existing transmitter identifier as one of the receiver characteristics.

34. The radio relay of claim 30 wherein the existing transmitter from which the radio relay learned the receiver characteristics transmits an existing transmitter identifier, the radio relay storing as one of the receiver characteristics a transmitter identifier different from the existing transmitter identifier.

35. The radio relay of claim 30 wherein one of the receiver characteristics is a carrier frequency of the radio frequency control signals.

36. The radio relay of claim 30 wherein one of the receiver characteristics is a code word contained in data modulating a carrier frequency of the radio frequency control signals.

37. The radio relay of claim 30 wherein one of the receiver characteristics is a type of code contained in data modulating a carrier frequency of the radio frequency control signals.

38. The radio relay of claim 30 wherein the radio relay functions as a clone of the existing transmitter from which the radio relay learned the receiver characteristics.

39. The radio relay of claim 30 wherein the radio frequency control signals received by the radio receiver contain a rolling code, the receiver operative to ignore control signals having a rolling code value within a rear window of possible rolling code values, the radio relay transmitting radio frequency control signals to the radio receiver so as to place the existing transmitter from which the radio relay learned the receiver characteristics into the receiver rolling code value rear window.

40. The radio relay of claim 39 wherein the radio relay is operative to receive a transmission from the existing transmitter from which the radio relay learned the receiver characteristics and to transmit a radio frequency control signal to the receiver based on the received transmission, the transmitted radio frequency control signal having a rolling code value outside of the receiver rolling code value rear window.

41. The radio relay of claim 30 wherein the control logic establishes a plurality of channels, each channel assignable to one of a plurality of appliances, the control logic determining one of the channels based on a radio frequency command received from the new transmitter.

42. The radio relay of claim 30 further comprising a second transmitter operative to transmit an activation signal through AC wiring.

* * * * *